(12) United States Patent
Cheong et al.

(10) Patent No.: US 7,504,128 B2
(45) Date of Patent: Mar. 17, 2009

(54) METHOD OF FABRICATING ONE-WAY TRANSPARENT OPTICAL SYSTEM

(75) Inventors: Byoung-ho Cheong, Seoul (KR); Young-gu Jin, Hwaseong-si (KR); Dae-sung Song, Yongin-si (KR); Jong-sun Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 370 days.

(21) Appl. No.: 11/265,192

(22) Filed: Nov. 3, 2005

(65) Prior Publication Data
US 2006/0099333 A1    May 11, 2006

(30) Foreign Application Priority Data
Nov. 6, 2004 (KR) .................. 10-2004-0090125

(51) Int. Cl.
*B05D 5/06* (2006.01)

(52) U.S. Cl. .................. 427/162; 427/421.1
(58) Field of Classification Search .......... 427/162, 427/421.1
See application file for complete search history.

(56) References Cited

U.S. PATENT DOCUMENTS

| | | | |
|---|---|---|---|
| 5,596,429 A * | 1/1997 | Kokawa et al. .............. 349/67 |
| 5,620,775 A * | 4/1997 | LaPerre ...................... 428/149 |
| 6,144,491 A * | 11/2000 | Orikasa et al. .............. 359/452 |
| 7,271,862 B2 * | 9/2007 | Matsunaga et al. .......... 349/64 |
| 2005/0152032 A1 * | 7/2005 | Olofson et al. .............. 359/453 |

* cited by examiner

*Primary Examiner*—Alain L Bashore
(74) *Attorney, Agent, or Firm*—Sughrue Mion, PLLC (57) ABSTRACT

A method of fabricating a one-way transparent optical system designed to transmit almost 100% of internal light while effectively blocking radiation of external light. The method includes: forming bead-shaped light absorbing elements; dispersing the light absorbing elements over a soft transparent film; and curing the soft transparent film to fix the dispersed light absorbing elements onto the transparent film.

25 Claims, 12 Drawing Sheets

METHOD OF FABRICATING ONE-WAY TRANSPARENT OPTICAL SYSTEM

CROSS-REFERENCE TO RELATED PATENT APPLICATION

This application claims the benefit of Korean Patent Application No. 10-2004-0090125, filed on Nov. 6, 2004, in the Korean Intellectual Property Office, the disclosure of which is incorporated herein in its entirety by reference.

BACKGROUND OF THE INVENTION

1. Field of the Invention

The present invention relates to a method of fabricating a one-way transparent optical system, and more particularly, to a method of fabricating a one-way transparent optical system designed to transmit almost 100% of internal light while effectively blocking external light.

2. Description of the Related Art

Figure 1:
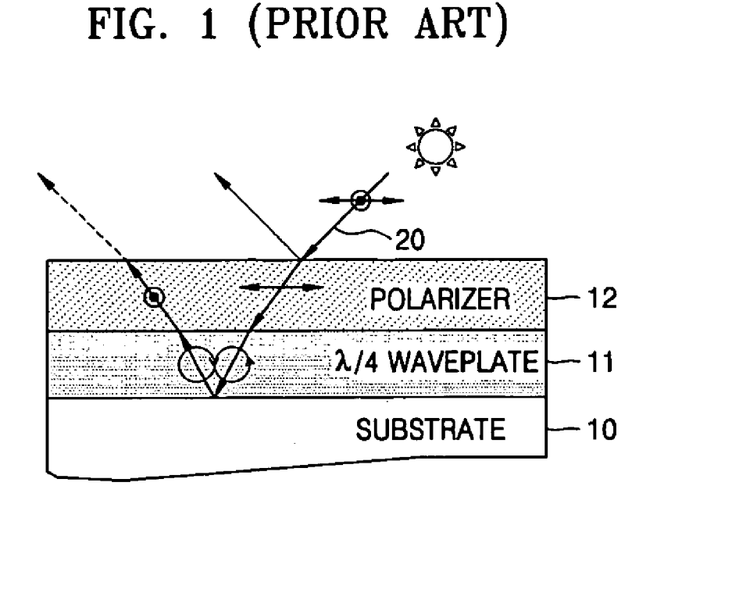
FIG. 1 schematically shows an optical system designed to prevent a dazzling effect.

When an emissive display device such as an organic electroluminescent display (OELD) is used, external light reflected from a surface of the display produces a dazzling effect. The self-emitting display also undergoes degradation in contrast due to external light reflected by a metal electrode. Referring to FIG. 1, in order to prevent these problems, a conventional display device uses an optical system having an anti-reflective coating (not shown), a polarizer 12, and a λ/4 waveplate 11 provided on substrate 10. That is, the anti-reflective coating is used to minimize the amount of external light 20 reflected from a surface of a display, thereby preventing a dazzling effect. The polarizer 12 and the λ/4 waveplate 11 are disposed on the surface of the display and suppress re-emission of incoming external light, thereby preventing contrast degradation. As shown in FIG. 1, that is, the external light 20 passing through the polarizer 12 has only a linearly polarized component. However, since the external light 20 having the linearly polarized component is transformed into circularly polarized light as it passes through the λ/4 waveplate 11, the reflected light cannot pass through the polarizer 12, thus suppressing re-emission of the external light 20.

However, the polarizer 12 and the λ/4 waveplate 11 in the conventional optical system are used to restrict emission of internal light as well as external light, thereby allowing less than 50% emission of internal light from the display. This may prevent dazzling effect and contrast degradation but decreases luminous efficiency and brightness of the display.

SUMMARY OF THE INVENTION

The present invention provides a one-way transparent optical system designed to transmit almost 100% of internal light while effectively blocking external light and a method of fabricating the same.

The present invention also provides a highly bright display device designed to provide high brightness while preventing dazzling effect and contrast degradation and a method of manufacturing the same.

According to a first aspect, the present invention provides a method of manufacturing a one-way transparent optical system, which includes: forming bead-shaped light absorbing elements; dispersing the light absorbing elements over a soft transparent film; and curing the soft transparent film to fix the dispersed light absorbing elements onto the transparent film.

The forming of the bead-shaped light absorbing elements preferably includes forming light absorbing materials and forming transparent shells around the light absorbing materials. Each of the light absorbing materials preferably contains carbon black or a black dye. Preferably, the refractive index of the transparent shells is substantially equal to that of the transparent film.

The dispersing of the light absorbing elements over the transparent film preferably includes: providing a roller master having an embossed pattern on an outer surface thereof; rotating the roller master over the transparent film and forming an engraved pattern on one side of the transparent film; and sprinkling the light absorbing elements over the side of the transparent film having the engraved pattern. Alternatively, the same step may include: providing a master mold by forming an embossed pattern on a surface of a mold; pressing the master mold onto the transparent film and forming an engraved pattern on one side of the transparent film; and spraying the light absorbing elements over the side of the transparent film having the engraved pattern.

According to another aspect, the present invention provides a method of manufacturing a one-way transparent optical system, which includes: forming and patterning a mask on a top surface of a transparent substrate to form patterns on the top surface of the transparent substrate; forming light absorbing materials within the patterns and removing the mask; and forming convex lens-shaped projecting structures on the transparent substrate in which the light absorbing materials have been formed within the patterns, the projecting structures refracting incident light rays into the corresponding light absorbing materials. The spacings between the patterns formed on the top surface of the transparent substrate need not be uniform.

The forming of the convex lens-shaped projecting structures preferably includes:

forming a layer of a transparent optical material on the transparent substrate in which the light absorbing materials have been formed; patterning the layer of the transparent optical material to form a plurality of projecting structures; and melting and cooling the patterned projecting structures to form convex lens-shaped projecting structures.

The light absorbing materials are preferably disposed beneath the centers of bottom surfaces of the corresponding patterned projecting structures. In a preferred embodiment, the transparent optical material is an emulsion-polymerized methylmethacrylate (MMA) and has substantially the same refractive index as that of the transparent substrate.

According to another embodiment of the present invention, the forming of the convex lens-shaped projecting structures includes: forming a layer of a transparent optical material on the transparent substrate in which the light absorbing materials have been formed; patterning the layer of the transparent optical material to form a plurality of transparent pillars between the light absorbing materials; inserting and arranging spherical transparent beads between the transparent pillars; and melting and cooling the transparent beads to form convex lens-shaped projecting structures. The light absorbing materials are preferably disposed beneath centers between the plurality of transparent pillars. Preferably, the refractive index of the transparent beads is substantially equal to that of the transparent substrate.

According to yet another aspect, the present invention provides a method of manufacturing a one-way transparent optical system, which includes: forming and patterning a mask on a top surface of a transparent substrate to form a plurality of grooves in the mask; forming bead-shaped light absorbing elements; dispersing the light absorbing elements in the grooves formed in the mask; melting the light absorbing elements so as to infiltrate the grooves in the mask; and removing the mask, and again melting and cooling the light absorbing elements to form convex lens-shaped projecting structures. The width of the grooves formed in the mask and the transparent substrate is less than the diameter of the bead-shaped light absorbing elements. The convex lens-shaped projecting structures formed on the transparent substrate refract incident light rays into the corresponding light absorbing materials.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described in greater detail by reference to the attached drawings. However, the present invention should not be construed as being limited thereto.

Figure 2:
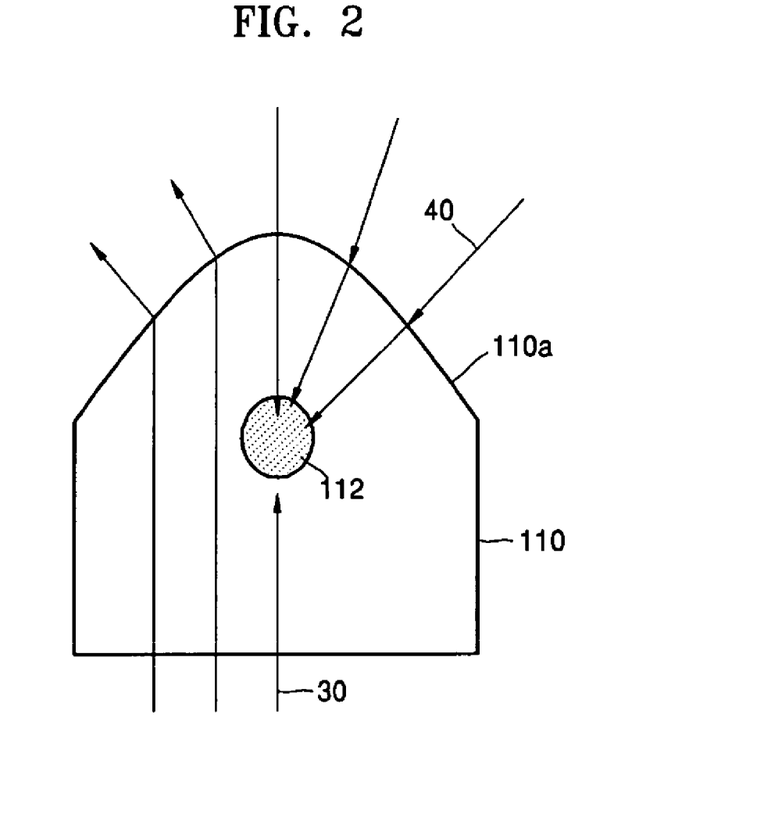
FIG. 2 is a cross-sectional view schematically showing the basic structure of a one-way transparent optical system according to the present invention.

Referring to FIG. 2, a light absorbing material 112 is buried in a transparent optical material 110, such as a transparent film, having a projecting structure 110a formed on the top surface thereof. The projecting structure 110a has the shape of a convex lens. However, the projecting structure 110a may have various other shapes such as a hemispherical, spheroidal, or polygonal shape. The light absorbing material 112 is made of a carbon black or black dye and is disposed near a focal region of the convex lens-shaped projecting structure 110a. Thus, external light incident from outside is refracted by the projecting structure 110a into the light absorbing material 112 and absorbed thereby. The projecting structure 110a may have a hemispherical shape such that the external light 40 from a wide range of incident angles is refracted into the substantially small focal region.

On the other hand, internal light 30 produced in a light-emitting layer (not shown) located below the transparent optical material 110 propagates in a direction opposite the external light 40. The internal light 30 may be image light, and the light-emitting layer may be a phosphor layer in the case of a plasma display panel (PDP), an electroluminescent (EL) layer in the case of an organic EL display (OELD), or light-emitting layer or phosphor layer in the case of other types of displays. As shown in FIG. 2, the light absorbing material 112 has a small horizontal cross-section. Thus, since most of the internal light 30 generated by the light-emitting layer is refracted out through the transparent optical material 110, only the remaining portion of the light 30 collides with and is absorbed into the light absorbing material 112.

The projecting structure 110a may have a diameter of about 0.1 to about 100 μm, preferably 1 to 10 μm. In another embodiment, the projecting structure 110a has a diameter of about 3 to about 10 μm. The light absorbing material 112 may have a diameter of up to half the diameter of the projecting structure 110a. The diameter of the light absorbing material 112 should be suitably selected to achieve a balance between the amount of the external light 40 absorbed by the light absorbing material 112 and the amount of the internal light 30 emitted by the light-emitting layer. That is, the diameter of the light absorbing material 112 should be large enough to absorb a sufficient amount of the external light 40 and be sufficiently small so as not to block an excessive amount of the internal light 30 emitted by the light-emitting layer. For example, the diameter of the light absorbing material 112 may be one-hundredth to one half, preferably one fifth to one third, the diameter of the projecting structure 110a.

Figure 3:
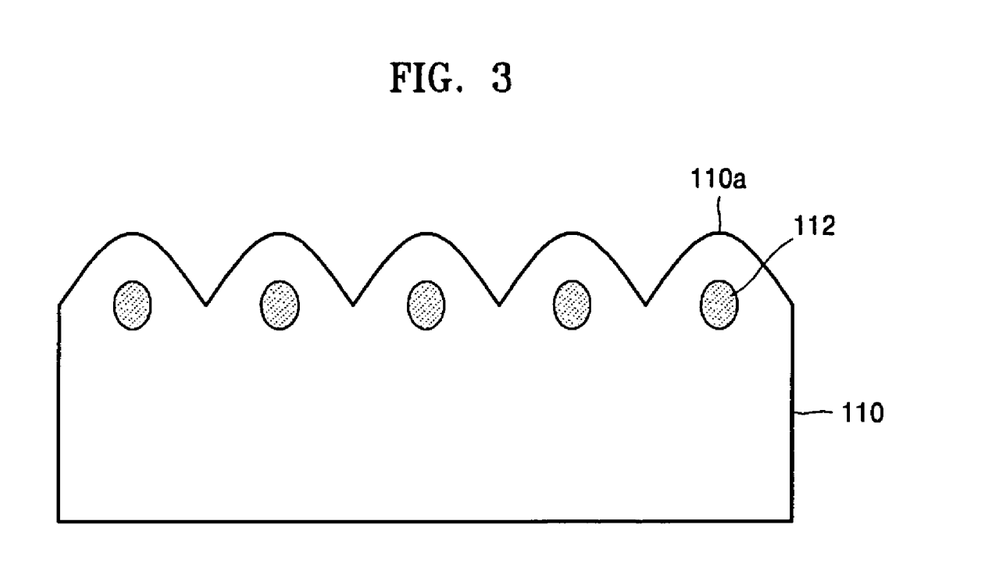
FIG. 3 illustrates the structure of a one-way transparent optical system according to a first embodiment of the present invention.

FIG. 3 illustrates a one-way transparent optical system according to a first embodiment of the present invention, namely a reflection and dazzling preventive layer formed by two-dimensionally arranging the one-way transparent optical systems of FIG. 2. As described above, external light 40 is refracted by the convex lens-shaped projecting structures 110a into the light absorbing materials 112 and thereby absorbed, while nearly all of the internal light 30 passes through the light absorbing materials 112. The one-way transparent optical system with this simple configuration can absorb almost 100% of external light while transmitting most internal light. When the one-way transparent optical system is used in a display device, the brightness of the display device can be increased to more than twice the brightness of a conventional display. The display device also suffers little dazzling effect due to reflected light rays.

The projecting structures 110a having a micrometer diameter (e.g., of 0.1 to 100 μm) refract most of external light 40 into the light absorbing materials 112 and scatter some of the external light 40, thereby reducing a dazzling effect caused by reflecting the external light 40 from the surfaces of the projecting structures 110a. In this case, the spacings between and the sizes of the projecting structures 110a may be made uneven so as not to produce an interference pattern between reflected light rays.

Figure 4:
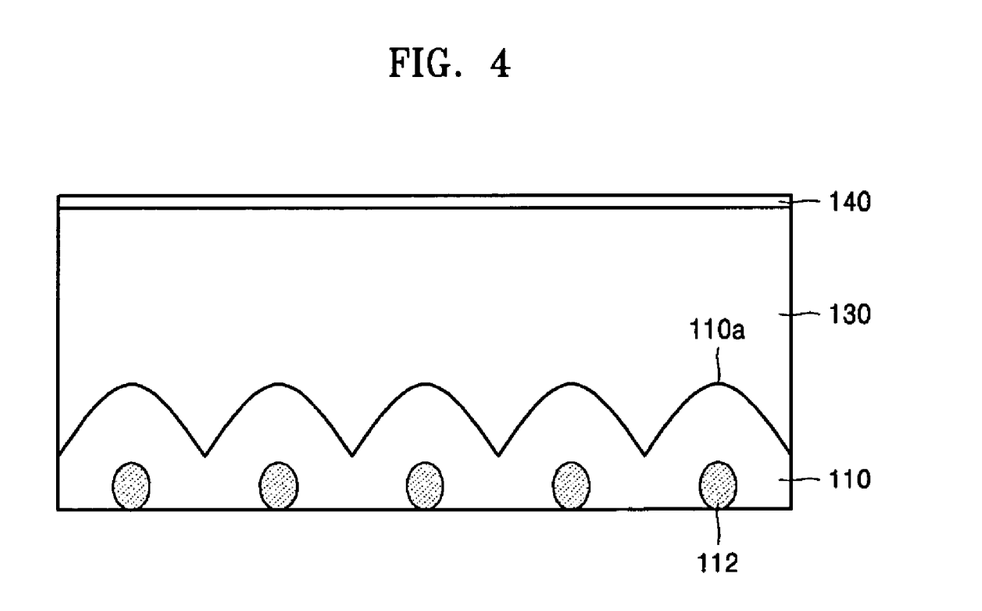
FIG. 4 illustrates the structure of a one-way transparent optical system according to a second embodiment of the present invention.

FIG. 4 illustrates a one-way transparent optical system according to a second embodiment of the present invention. Referring to FIG. 4, the one-way transparent optical system includes a transparent optical material 110 having a plurality of projecting structures 110a formed on the top surface thereof, light absorbing materials 112 located near focal regions corresponding to the plurality of projecting structures 110a, a light-transmissive layer 130 disposed on the plurality of projecting structures 110a, and an anti-reflective coating 140 formed on the surface of the light transmissive layer 130. The light transmissive layer 130 preferably has a refractive index that is lower than that of a transparent material of the projecting structure 110a so that the projecting structures 110a refract incident light rays into the light absorbing materials 112. The anti-reflective coating 140 is used to almost eliminate reflections on the surface of the light transmissive layer 130. Most of the incident external light that passes through the light transmissive layer 130 without being reflected is refracted by the projecting structures 110a into the light absorbing materials 112 and thereby absorbed. For the same reason as above, the projecting structures 110a may be arranged in a non-uniform fashion.

Figure 5A:
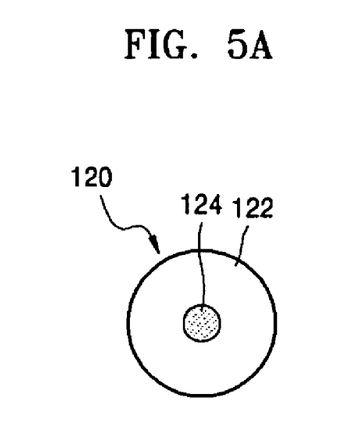
FIG. 5A shows a micro bead according to the present invention.

FIG. 5A shows a bead-shaped light absorbing element 120 having a light absorbing material 124 buried in the center thereof according to the present invention. Referring to FIG. 5A, the light absorbing material 124 may be formed by emulsion polymerization of a transparent material such as methylmethacrylate (MMA) onto a material such as carbon black or black dye. The light absorbing material 124 may have a spherical shape with a diameter of about 1 μm, and the volume of the carbon black or black dye can occupy, for example, 15% of the total volume. A shell 122 having a thickness of about 2 μm is also formed around an outer circumference of the light absorbing material 124 by emulsion polymerization of a transparent material such as MMA or similar material.

Figure 5B:
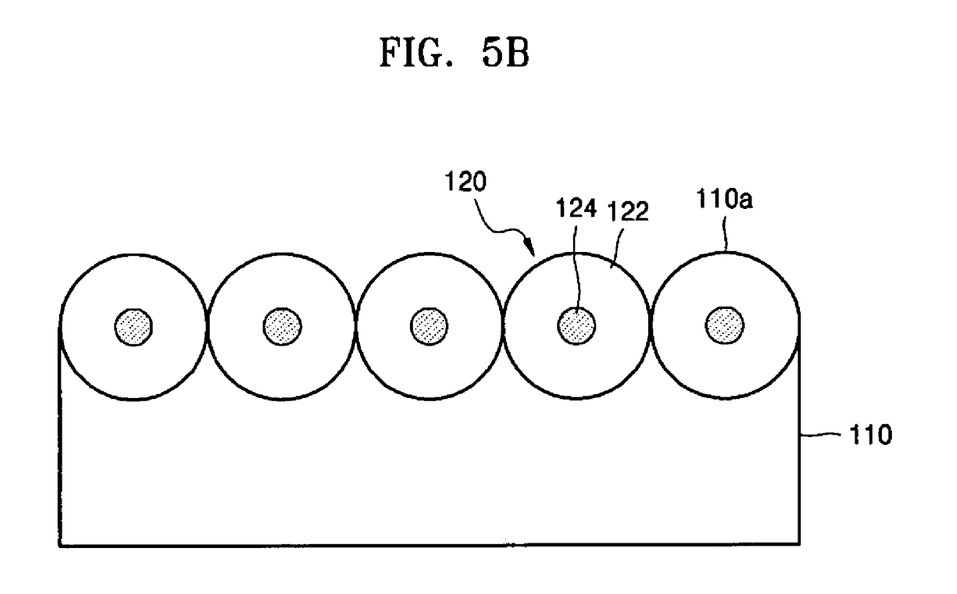
FIG. 5B illustrates the structure of a one-way transparent optical system using the micro beads of FIG. 5A according to a third embodiment of the present invention.

FIG. 5B illustrates a one-way transparent optical system embodiment according to a third embodiment of the present invention including a plurality of bead-shaped light absorbing elements 120 shown in FIG. 5A. The bead-shaped light absorbing elements 120 are dispersed over a transparent optical material 110 such as a transparent film and then emulsion polymerization of a coating material (not shown) such as MMA is carried out to fix the plurality of light absorbing elements 120 onto the transparent optical material 110. To accomplish this, a coating material such as MMA is interposed between the light absorbing element 120 and the transparent optical material 110. During the emulsion polymerization, a 1 to 5 wt % of crosslinking agent may be used to prevent expansion of the light absorbing element 120 when the light absorbing element 120 is dispersed into the coating material. Since the shell 122 of the light absorbing element 120, the transparent optical material 110, and the coating material have substantially the same refractive index, no light refraction occurs at an interface between the light absorbing element 120 and the transparent optical material 110. Refraction occurs only at a hemispherical upper surface 110a.

Methods of fabricating one-way transparent optical systems according to embodiments of the present invention will now be described with reference to FIGS. 6A-9F.

Figure 6A:
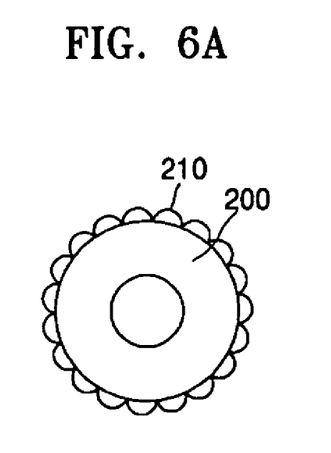
FIGS. 6A-6E illustrate a process of fabricating a one-way transparent optical system according to a first embodiment of the present invention.
Figure 6B:
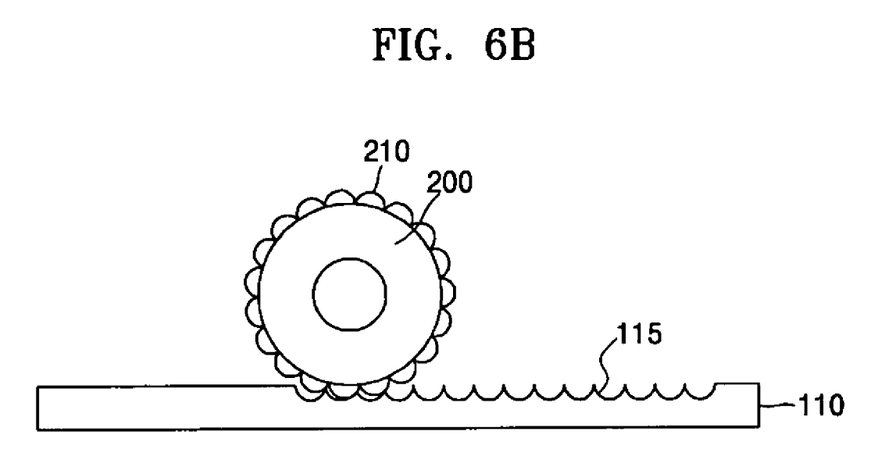
Figure 6C:
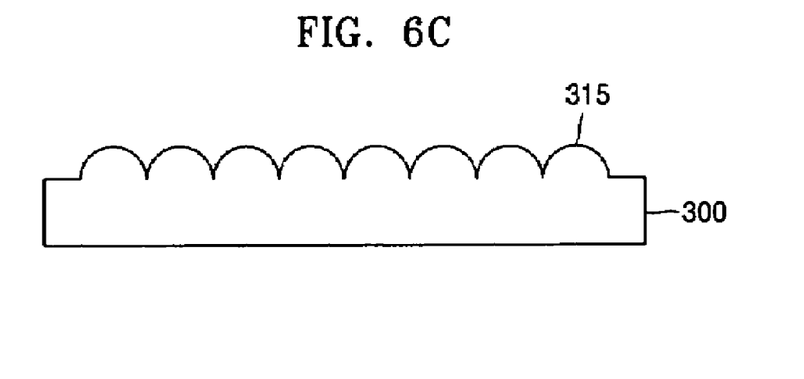
Figure 6D:
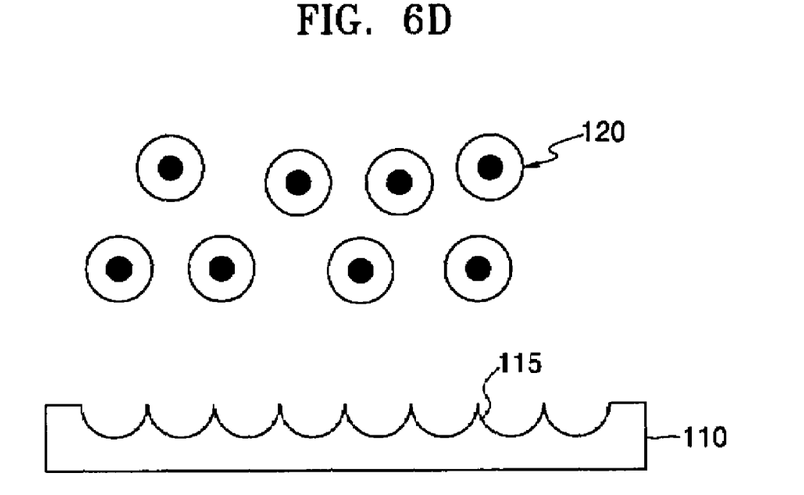
Figure 6E:
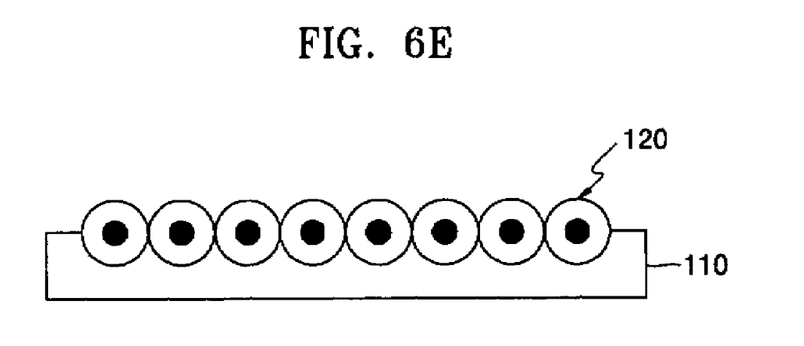

FIGS. 6A-6E illustrate a process of fabricating a one-way transparent optical system according to a first embodiment of the present invention. Referring to FIG. 6A, first, a roller master 200 having an embossed pattern 210 on an outer surface thereof is fabricated. Then, referring to FIG. 6B, the roller master 200 is rotated over a transparent film 110 such as a flexible, photocurable polymer or monomer film. For example, the transparent film 110 may be a MMA coating polymerized and cured with heat or ultraviolet (UV) radiation. After rotation of the roller master 200, an engraved pattern 115 is formed on one side of the transparent film 110. Referring to FIG. 6D, prepared light absorbing elements 120 are sprinkled over the transparent film 110 and dispersed into the engraved pattern 115 formed on the one side of the transparent film 110. Each of the light absorbing elements 120 is the bead-shaped light absorbing element 120 of FIG. 5A. Referring to FIG. 6E, once the bead-shaped light absorbing elements 120 are dispersed into the engraved pattern 115 of the transparent film 110, the transparent film 110 is cured by heating or by exposing to UV radiation in order to fix the light absorbing elements 120 onto the transparent film 110.

A master mold may be used instead of the roller master 200. That is, as shown in FIG. 6C, after an embossed pattern 315 is formed on a surface of the mold and then cured to form a master mold 300, the master mold 300 is pressed onto the transparent film 110. Then, as shown in FIG. 6B, the engraved pattern 115 is formed on one side of the transparent film 110. Subsequent process steps are performed as shown in FIGS. 6D and 6E. Using the roller master 200 or the maser mold 300 makes it possible to manufacture a large-area one-way transparent optical system.

As described above, the transparent film (substrate) 110 and the shell 122 of the light absorbing element 120 may all be emulsion-polymerized MMA, i.e., poly MMA (PMMA). Since the transparent film 110 has substantially the same refractive index as the light absorbing element 120, no refraction occurs at an interface between the transparent film 110 and the light absorbing element 120.

FIGS. 7A-7H illustrate sequential process steps of a method of fabricating a one-way transparent optical system according to a second embodiment of the present invention.

Figure 7A:
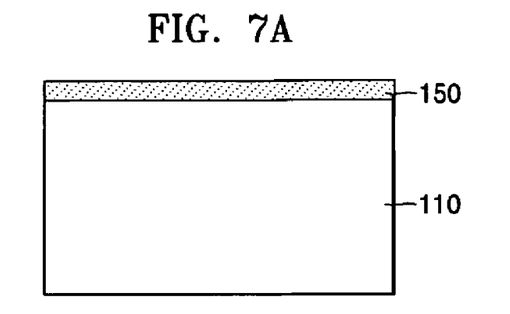
FIGS. 7A-7H illustrate a process of fabricating a one-way transparent optical system according to a second embodiment of the present invention.
Figure 7B:
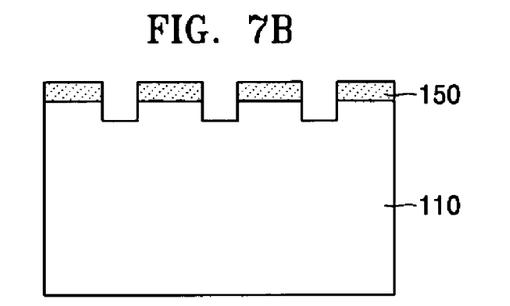
Figure 7C:
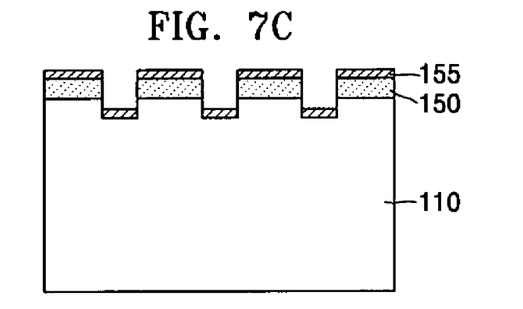

First, referring to FIG. 7A, a photosensitive mask 150 is applied on a transparent substrate 110 to a thickness of about 1 to about 2 μm. For example, the transparent substrate 110 may be made of emulsion-polymerized MMA (i.e., PMMA). Referring to FIG. 7B, photolithography is performed to form a predetermined pattern on the mask 150, followed by etching of a top surface of the transparent substrate 110 to form the same pattern as the predetermined pattern on the top surface of the transparent substrate 110. FIG. 7B shows the mask 150 and the transparent substrate 110 thus patterned. The width of each pattern may be about 1 to about 3 μm and the depth of the pattern on the transparent substrate may be about 1 to about 2 μm. Subsequently, as shown in FIG. 7C, a metal coating 155 is thinly formed on the etched mask 150 and within the pattern of transparent substrate 110. The metal coating 155 reflects internal light produced in a light-emitting layer (not shown) disposed below the transparent substrate 110, thereby preventing the internal light from being absorbed by a light absorbing material (to be described later). Since the internal light reflected by the metal coating 155 is totally reflected at a bottom surface of the transparent substrate 110 to the outside, nearly 100% of the internal light is emitted from the optical system with little loss. The metal coating 155 may have a thickness of about 0.1 μm. The coating 155 may be made of a light reflective material other than metal.

Figure 7D:
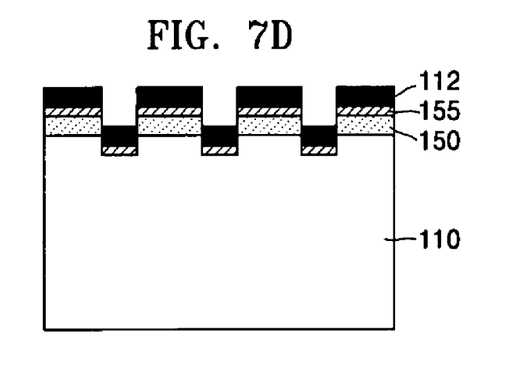
Figure 7E:
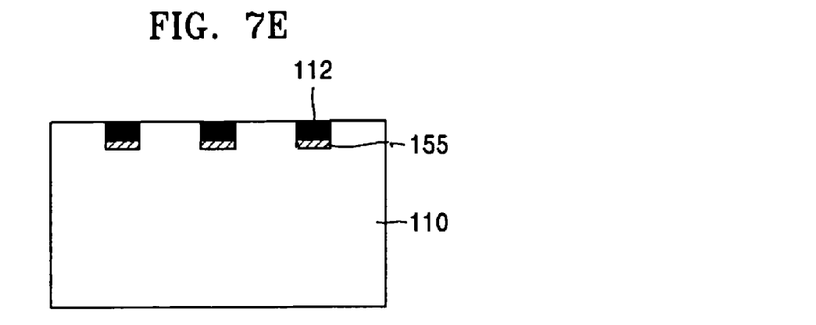

Referring to FIG. 7D, after forming the metal coating 155, a layer of a light absorbing material 112 is formed on the metal coating 155 to a thickness of about 1 to about 2 μm. The light absorbing material 112 may be carbon black or black dye. After forming the layer of light absorbing material 112 in this manner, as shown in FIG. 7E, lift-off or etching is performed to remove the mask 150 and the light absorbing material 112 formed on the mask 150. Thus, the light absorbing material 112 remains only within the pattern formed on the transparent substrate 110.

Figure 7F:
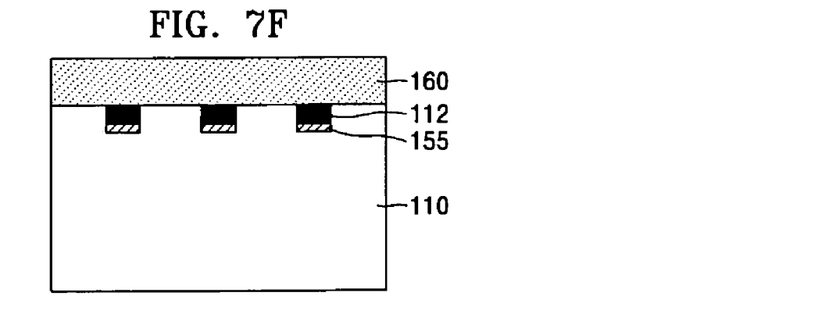
Figure 7G:
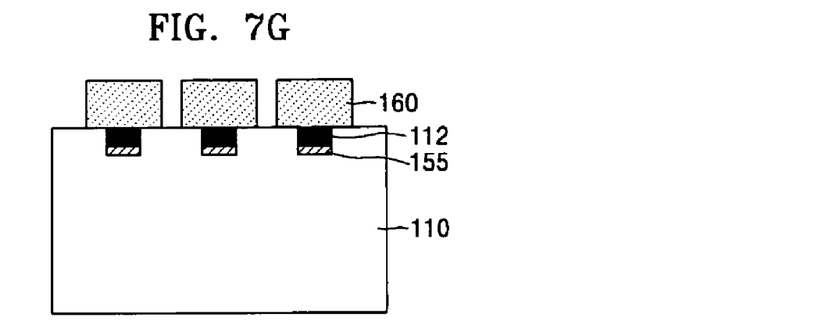

Then, as shown in FIG. 7F, a layer of a transparent optical material 160 is formed on the transparent substrate 110 having the light absorbing materials 112 formed therein to a thickness of about 2 to about 3 μm. The layer of the transparent optical material 160 may be made of the same material, PMMA, as the transparent substrate 110 or other transparent material having substantially the same refractive index as the transparent substrate 110. Referring to FIG. 7G, the layer of the transparent optical material 160 is patterned to form a plurality of polygonal prism- or cylindrical-shaped projecting structures on the transparent substrate 110. The width of each of the plurality of projecting structures is about 5 μm. As shown in FIG. 7G, the light absorbing materials 112 are disposed beneath the centers of bottom surfaces of the plurality of corresponding projecting structures.

Figure 7H:
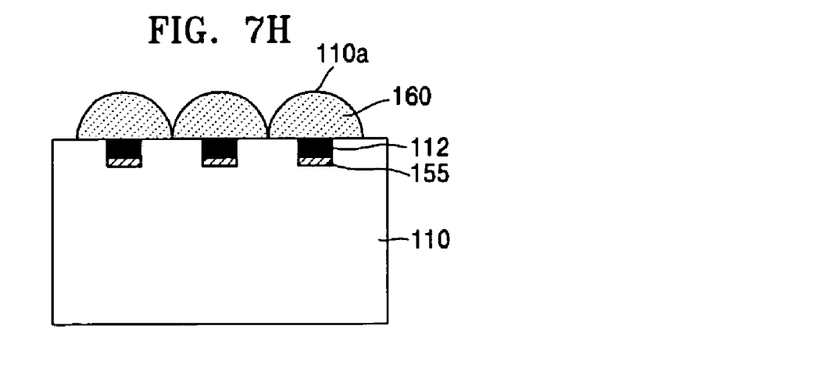

Lastly, referring to FIG. 7H, a well-known bake & reflow process is performed to melt and freeze the patterned polygonal prism- or cylindrical-shaped projecting structures, thus forming convex lens-shaped projecting structures 110a. For example, when being heated to a predetermined temperature using a hot plate, a halide lamp, or a laser beam, the plurality of polygonal prism- or cylindrical-shaped projecting structures are melted and subsequently deformed into hemispherical ones due to surface tension. The temperature of heating may be suitably selected according to the type and thickness of a material used. When the polygonal prism- or cylindrical-shaped projecting structures are completely melted and deformed into the projecting structures 110a having the shape of a hemispherical convex lens, the projecting structures 110a are cooled and cured. The convex lens-shaped projecting structures 110a thus formed can refract incident light rays into the corresponding light absorbing materials 112.

Meanwhile, by varying the spacing between adjacent patterns during the patterning process illustrated in FIG. 7B, the spacings between and sizes of convex lens-shaped projecting structures 110a may be made uneven so as not to produce an interference pattern due to interference between light rays reflected from the surfaces of the projecting structures 110a.

Figure 8A:
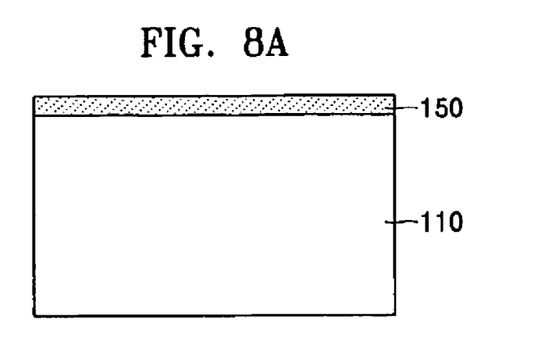
FIGS. 8A-8I illustrate a process of fabricating a one-way transparent optical system according to a third embodiment of the present invention.
Figure 8B:
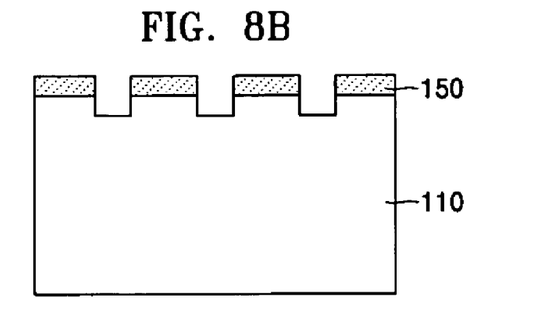
Figure 8C:
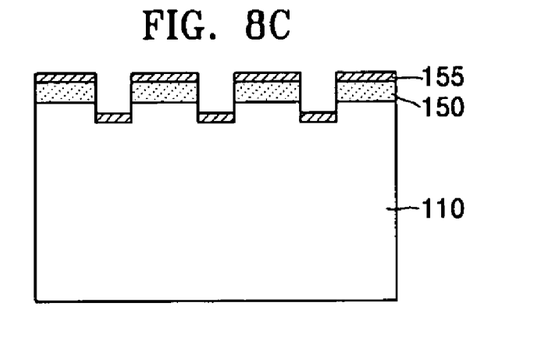
Figure 8D:
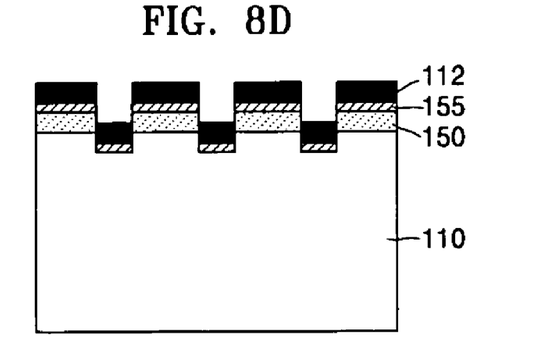
Figure 8E:
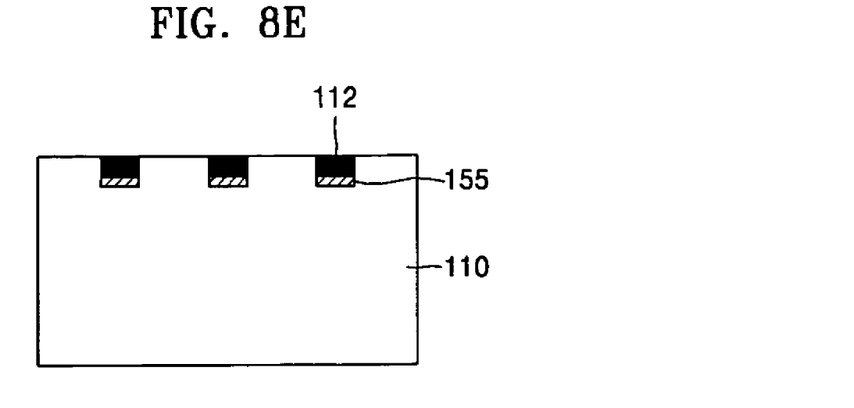
Figure 8F:
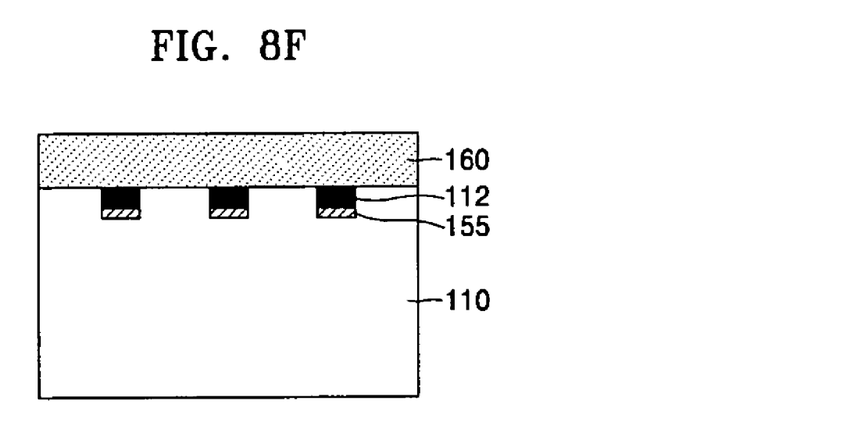

FIGS. 8A-8I illustrate sequential process steps of a method of fabricating a one-way transparent optical system according to a third embodiment of the present invention; and As evident from FIGS. 8A-8E, the fabrication method according to the third embodiment includes the same process steps as those shown in FIGS. 7A-7F. That is, referring to FIGS. 8A and 8B, a mask 150 is formed on a transparent substrate 110 and patterned. Then, referring to FIGS. 8C and 8D, metal coatings 155 and layers of light absorbing materials 112 are formed within the patterns. The mask 150 is removed (FIG. 8E) and a layer of a transparent optical material 160 is formed on the transparent substrate 110 from which the mask 150 has been removed (FIG. 8F). Here, the transparent substrate 110, the layers of the light absorbing materials 112, or the layer of the transparent optical material can be made of the same materials as above.

Figure 8G:
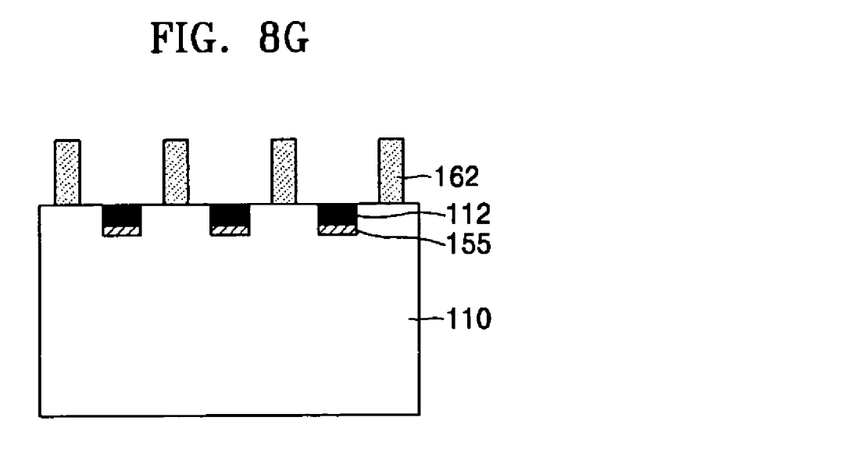
Figure 8H:
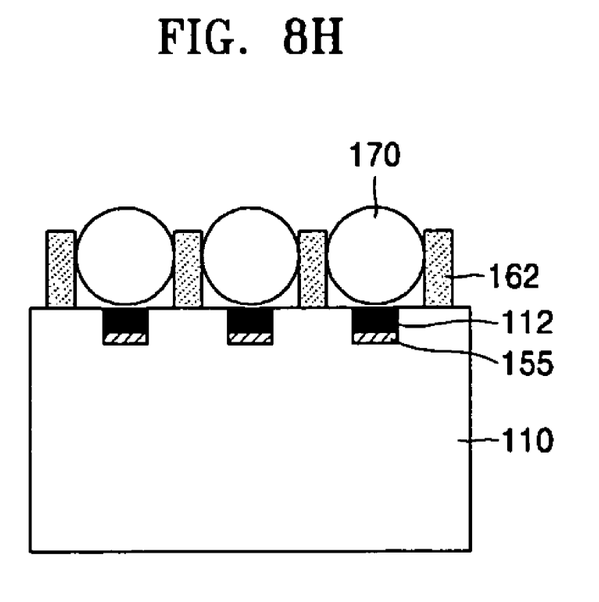

Referring to FIG. 8G, the layer of the transparent optical material 160 is patterned to form a plurality of transparent pillars 162. That is, the light absorbing materials 112 are disposed beneath centers between the plurality of transparent pillars 162, as opposed to the light absorbing materials 112 shown in FIG. 7G. Then, referring to FIG. 8H, spherical transparent beads 170 are respectively inserted and arranged between the transparent pillars 162. The spacing between the transparent pillars 162 may be slightly less than or substantially equal to the diameter of the transparent bead 170. Here, the spacing between the transparent pillars 162 may be about 5 µm.

Figure 8I:
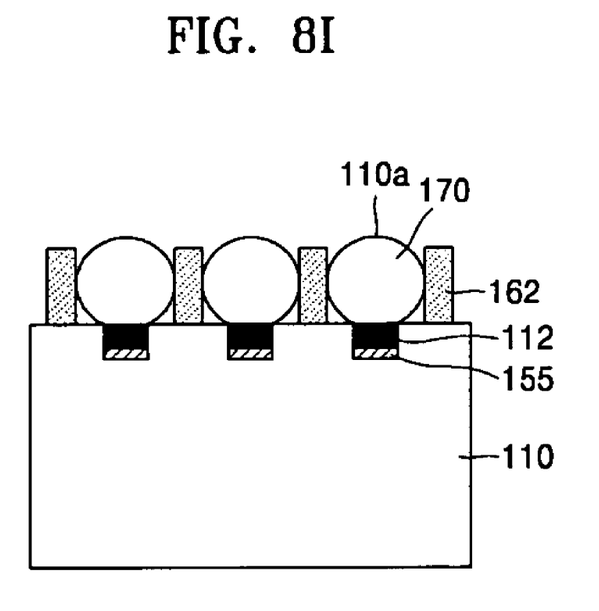

Lastly, as shown in FIG. 8I, a well-known bake & reflow process is performed to melt and cool the transparent beads 170, thus forming convex lens-shaped projecting structures 110a. For example, when being heated to a predetermined temperature using a hot plate, a halide lamp, or a laser beam, the transparent beads 170 are gradually melted and then completely inserted between the transparent pillars 162. The bottom of the transparent bead 170 is in contact with the light absorbing material 112 and the top thereof is deformed into a hemispherical lens shape. When the bottom of the transparent bead 170 contacts the light absorbing material 112 and the top is deformed into a convex lens-shaped projecting structure 110a, the projecting structures 110a are cooled and cured. During this process, the transparent pillars may also be melted and deformed. However, since an essential feature of the present invention lies in deforming the transparent beads 170 into the convex lens-shaped projecting structures 110a that are subsequently fixed onto the transparent substrate 110a, the deformation of the transparent pillars 162 is not essential.

FIGS. 9A-9F illustrate sequential process steps of a method of fabricating a one-way transparent optical system according to a fourth embodiment of the present invention.

Figure 9A:
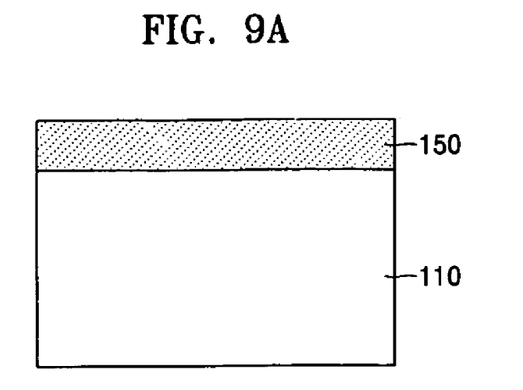
FIGS. 9A-9F illustrate a process of fabricating a one-way transparent optical system according to a fourth embodiment of the present invention.
Figure 9B:
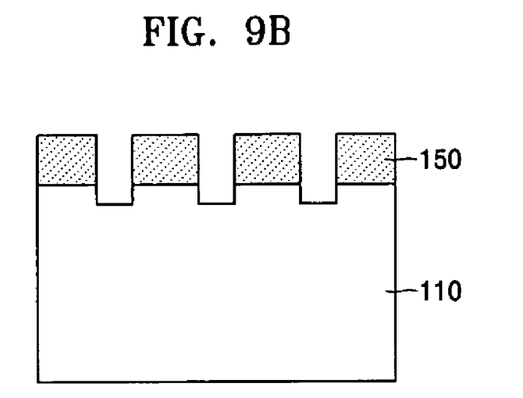
Figure 9C:
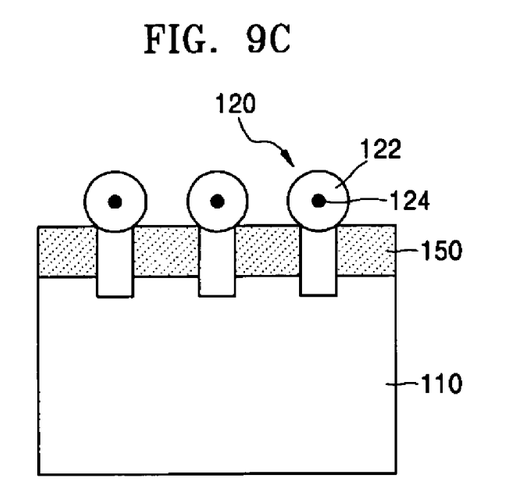

First, referring to FIG. 9A, a photosensitive mask 150 is applied on a transparent substrate 110. For example, the transparent substrate 110 may be made of emulsion-polymerized MMA (i.e., PMMA). Referring to FIG. 9B, photolithography is performed to form a predetermined pattern on the mask 150, followed by etching of the mask 150 and the substrate 110 into the predetermined pattern. FIG. 9B shows the mask 150 and the transparent substrate 110 thus patterned. While it is described that the pattern is formed on the mask 150 as well as on the top surface of the transparent substrate 110, the pattern may be formed only on the mask 150. Then, referring to FIG. 9C, prepared light absorbing elements 120 are disposed on corresponding patterns formed on the mask 150. While the light absorbing elements 120 are depicted to be partially inserted into the patterns formed on the mask 150 in FIG. 9C, they may be completely inserted in the patterns. The width of the patterns may be slightly less than or greater than the diameter of the light absorbing elements 120. Each of the light absorbing elements 120 is the bead-shaped light absorbing element 120 of FIG. 5A.

Figure 9D:
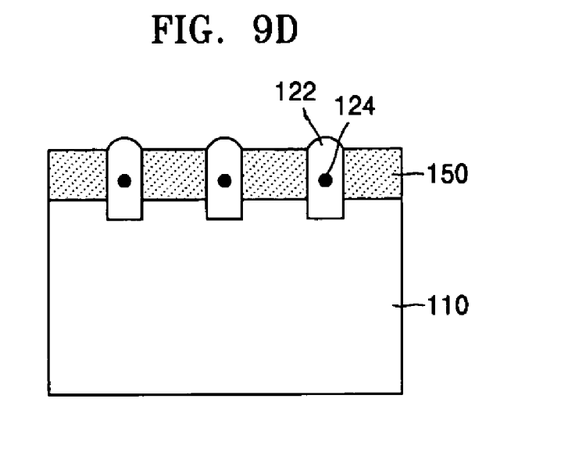

Referring to FIG. 9D, once the bead-shaped light absorbing elements 120 are dispersed on the grooves of the mask 150, a well-known bake & reflow process is performed to melt the light absorbing elements 120 so that the light absorbing elements 120 completely infiltrate into the corresponding patterns formed on the mask 150. If the patterns are formed on the transparent substrate 110 as well, the depth of the patterns should be significantly less than the diameter of the light absorbing elements 120 so that the melted light absorbing elements 120 project outward from the transparent substrate 110.

Figure 9E:
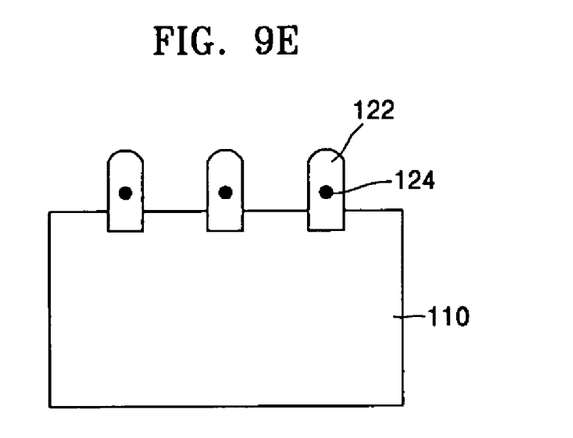
Figure 9F:
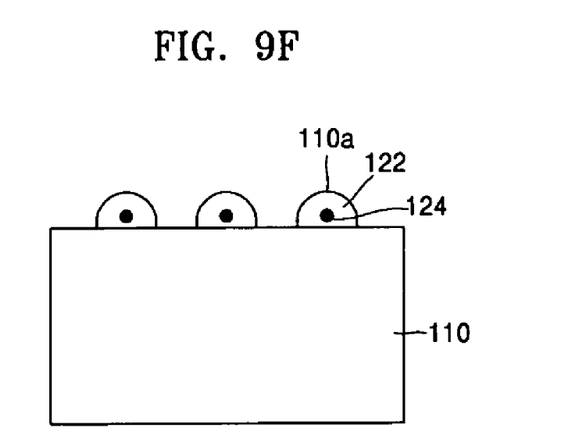

Then, as shown in FIG. 9E, the mask 150 is removed by etching, so that the light absorbing elements 120 having the shape of a pillar project out from the transparent substrate 110. Lastly, referring to FIG. 9F, a bake & reflow process is performed to melt and cool the light absorbing elements, thus forming convex lens-shaped projecting structures 110a. For example, when being heated to a predetermined temperature using a hot plate, a halide lamp, or a laser beam, the light absorbing elements 120 are melted and gradually deformed into hemispherical shapes. When the light absorbing elements 120 are completely melted and deformed into the projecting structures 110a having the shape of a hemispherical convex lens, the projecting structures 110a are cooled and cured. The convex lens-shaped projecting structures 110a thus formed can refract incident light rays into the corresponding light absorbing materials 112 contained in the light absorbing elements 120.

Meanwhile, by varying the spacing between adjacent patterns formed on the transparent substrate 110 during the patterning process illustrated in FIG. 9B, the spacings between and sizes of convex lens-shaped projecting structures 110a may be made uneven. In this case, as described above, no interference pattern (due to interference between light rays reflected from the surfaces of the projecting structures 110a) is produced.

As described above, a one-way transparent optical system and a method of fabricating the same according to the present invention are capable of effectively blocking reflection of external light while maintaining luminous efficiency of internal light. Thus, a display device using the one-way transparent optical system can effectively prevent dazzling effect and contrast degradation while increasing brightness to more than twice the brightness of a conventional display. Another advantage of the present invention is a reduction in manufacturing cost compared to a conventional optical system using a polarizer due to its simple structure and use of inexpensive materials.

The present invention also permits flexibility in selecting processes and designs because it can be applied effectively to various types of light-emitting devices such as an organic EL device without particular limitation. Furthermore, the present invention can be used without a change in design for various applications requiring a transparent film selectively blocking light in a specified direction, such as applications in the fields of illumination and optical design, as well as display applications.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A method of manufacturing a one-way transparent optical system, which comprises:
    forming bead-shaped light absorbing elements, wherein the bead-shaped light absorbing elements comprise transparent shells formed around light absorbing materials;
    dispersing the light absorbing elements over a soft transparent film; and
    curing the soft transparent film to fix the dispersed light absorbing elements onto the transparent film.

2. The method of claim 1, wherein the light absorbing materials contain carbon black or black dye.

3. The method of claim 1, wherein the transparent shells are formed around the light absorbing materials by emulsion polymerization of methylmethacrylate (MMA), and the transparent shells have substantially the same refractive index as that of the transparent film.

4. The method of claim 1, wherein said dispersing comprises:
    providing a roller master having an embossed pattern on an outer surface thereof;
    rotating the roller master over the transparent film and forming an engraved pattern on one side of the transparent film; and
    sprinkling the light absorbing elements over the side of the transparent film having the engraved pattern.

5. The method of claim 1, wherein said dispersing comprises:
    providing a master mold having an embossed pattern on a surface of a mold;
    pressing the master mold onto the transparent film and forming an engraved pattern on one side of the transparent film; and
    spraying the light absorbing elements over the side of the transparent film having the engraved pattern.

6. The method of claim 1, wherein said curing comprises one or both of heating or exposing the transparent film to ultraviolet (UV) radiation.

7. A method of manufacturing a one-way transparent optical system, which comprises:
    forming and patterning a mask on a top surface of a transparent substrate to form patterns on the top surface of the transparent substrate;
    forming light absorbing materials within the patterns and removing the mask; and
    forming convex lens-shaped projecting structures on the transparent substrate in which the light absorbing materials have been formed within the patterns, the projecting structures refracting incident light rays into corresponding light absorbing materials underlying the projecting structures.

8. The method of claim 7, further comprising forming a light reflective layer within the patterns before forming the light absorbing materials within the patterns, the light reflective layer reflecting internal light toward a bottom surface of the transparent substrate.

9. The method of claim 7, wherein the light absorbing materials contain carbon black or black dye.

10. The method of claim 7, wherein spacings between the patterns formed on the top surface of the transparent substrate include uneven spacings.

11. The method of claim 7, wherein the forming of the convex lens-shaped projecting structures comprises:
    forming a layer of a transparent optical material on the transparent substrate in which the light absorbing materials have been formed;
    patterning the layer of the transparent optical material to form a plurality of projecting structures; and
    melting and cooling the patterned projecting structures to form convex lens-shaped projecting structures.

12. The method of claim 11, wherein the light absorbing materials are disposed beneath the centers of bottom surfaces of corresponding patterned projecting structures.

13. The method of claim 11, wherein the refractive index of the transparent optical material is substantially equal to that of the transparent substrate so that no light refraction occurs on an interface therebetween.

14. The method of claim 11, wherein the melting and cooling of the patterned projecting structures comprises a bake & reflow process.

15. The method of claim 7, wherein the forming of the convex lens-shaped projecting structures comprises:
    forming a layer of a transparent optical material on the transparent substrate in which the light absorbing materials have been formed;
    patterning the layer of the transparent optical material to form a plurality of transparent pillars between the light absorbing materials;
    inserting and arranging spherical transparent beads having the same diameter as the spacing between the transparent pillars; and
    melting and cooling the transparent beads to form convex lens-shaped projecting structures.

16. The method of claim 15, wherein the light absorbing materials are disposed beneath centers between the plurality of transparent pillars.

17. The method of claim 15, wherein the refractive index of the transparent beads is substantially equal to that of the transparent substrate.

18. The method of claim 15, wherein the melting and cooling of the transparent beads comprises a bake & reflow process.

19. A method of manufacturing a one-way transparent optical system, which comprises:

forming and patterning a mask on a top surface of a transparent substrate to form a plurality of grooves in the mask;

forming bead-shaped light absorbing elements;

dispersing the light absorbing elements in the grooves formed in the mask;

melting the light absorbing elements so as to infiltrate the grooves in the mask; and removing the mask, and again melting and cooling the light absorbing elements to form convex lens-shaped projecting structures.

20. The method of claim 19, wherein the width of the grooves formed in the mask and the transparent substrate is less than or equal to the diameter of the bead-shaped light absorbing elements.

21. The method of claim 19, wherein spacings between the grooves formed in the mask include uneven spacings.

22. The method of claim 19, wherein the bead-shaped light absorbing elements comprise transparent shells formed around light absorbing materials.

23. The method of claim 22, wherein the light absorbing materials contain carbon black or black dye.

24. The method of claim 22, wherein the convex lens-shaped projecting structures formed on the transparent substrate refract incident light rays into corresponding light absorbing materials.

25. The method of claim 22, wherein the refractive index of the transparent shells is substantially equal to that of the transparent substrate.

* * * * *